United States Patent
Op De Beeck et al.

(10) Patent No.: US 11,724,259 B2
(45) Date of Patent: Aug. 15, 2023

(54) PRODUCTION OF CHEMICAL REACTORS

(71) Applicant: PHARMAFLUIDICS NV, Ghent (BE)

(72) Inventors: Jeff Op De Beeck, Mariakerke (BE); Paul Jacobs, Lokeren (BE); Wim De Malsche, Berchem (BE)

(73) Assignee: PHARMAFLUIDICS nv, Ghent (BE)

( * ) Notice: Subject to any disclaimer, the term of this patent is extended or adjusted under 35 U.S.C. 154(b) by 411 days.

(21) Appl. No.: 16/315,217

(22) PCT Filed: Jun. 30, 2017

(86) PCT No.: PCT/IB2017/053947
§ 371 (c)(1),
(2) Date: Jan. 4, 2019

(87) PCT Pub. No.: WO2018/007915
PCT Pub. Date: Jan. 11, 2018

(65) Prior Publication Data
US 2019/0314817 A1  Oct. 17, 2019

(30) Foreign Application Priority Data
Jul. 4, 2016  (BE) .................................. 2016/5556

(51) Int. Cl.
*B01L 3/00* (2006.01)
*B01D 15/22* (2006.01)
(Continued)

(52) U.S. Cl.
CPC ........ *B01L 3/502753* (2013.01); *B01D 15/22* (2013.01); *B01D 53/025* (2013.01);
(Continued)

(58) Field of Classification Search
None
See application file for complete search history.

(56) References Cited

U.S. PATENT DOCUMENTS

| 8,492,587 B2 | 7/2013 | Olbert et al. |
| 9,333,750 B2 | 5/2016 | Kato |

(Continued)

FOREIGN PATENT DOCUMENTS

| CN | 103650204 A | 3/2014 |
| CN | 105008914 A | 10/2015 |

(Continued)

OTHER PUBLICATIONS

Belgian Search Report from BE Application No. 201605556, dated Mar. 24, 2017.

(Continued)

*Primary Examiner* — Kara M Peo
(74) *Attorney, Agent, or Firm* — Workman Nydegger

(57) ABSTRACT

A method for producing a chemical reactor, wherein the chemical reactor comprises one or more effective channels which comprise pillar structures, an input connected to one of the effective channels to allow fluid/gas into the effective channels and an output connected to one of the effective channels to remove at least one component of the liquid/gas. The method comprises obtaining an initial design of the reactor, further introducing into the initial design at least a structured area positioned adjacent to an effective channel of the one or more effective channels located at the edge of the initial design, the structured area not being fluidly connected to one of the effective channels, to obtain a further design and the production of the reactor according to the further design.

13 Claims, 1 Drawing Sheet

(51) Int. Cl.
   *B01D 53/02* (2006.01)
   *G01N 30/60* (2006.01)
(52) U.S. Cl.
   CPC ... *B01L 3/502707* (2013.01); *B01L 3/502746* (2013.01); *B01L 2300/0816* (2013.01); *B01L 2300/0864* (2013.01); *B01L 2400/086* (2013.01); *G01N 30/6095* (2013.01)

(56) References Cited

U.S. PATENT DOCUMENTS

| | | |
|---|---|---|
| 9,890,882 B2 | 2/2018 | Zeko et al. |
| 10,158,110 B2 | 12/2018 | Roumi |
| 2005/0255003 A1 | 11/2005 | Summersgill et al. |
| 2011/0269995 A1 | 11/2011 | Olbert et al. |
| 2012/0318049 A1 | 12/2012 | Hong et al. |
| 2013/0017432 A1 | 1/2013 | Roumi |
| 2014/0315335 A1 | 10/2014 | Kato |
| 2016/0001199 A1 | 1/2016 | De Malsche et al. |
| 2016/0003383 A1 | 1/2016 | Zeko et al. |
| 2016/0018365 A1 | 1/2016 | Agah et al. |

FOREIGN PATENT DOCUMENTS

| | | |
|---|---|---|
| CN | 105102113 A | 11/2015 |
| EP | 1916522 A1 | 4/2008 |
| JP | S6135966 A | 2/1986 |
| JP | 2006272564 A | 10/2006 |
| JP | 2007216123 A | 8/2007 |
| JP | 2009023097 A | 2/2009 |
| JP | 2011174856 A | 9/2011 |
| JP | 2014213485 A | 11/2014 |
| JP | 2016508440 A | 3/2016 |
| WO | 2004022233 A1 | 3/2004 |
| WO | 2010076209 A1 | 7/2010 |
| WO | 2014122592 A1 | 8/2014 |

OTHER PUBLICATIONS

International Search Report from PCT Application No. PCT/IB2017/053947, dated Oct. 2, 2017.
De Malsche et al., "Integration of Porous Layers in Ordered Pillar Arrays for Liquid Chromatography," The Royal Society of Chemistry, Lab Chip, vol. 7, 2007, pp. 1705-1711.
Office Action from corresponding Japanese Application No. 2018-569094, dated Jun. 8, 2021.
Office Action from corresponding CN Application No. 201780045341.2, dated Jul. 27, 2020.
De Malsche et al., "Integration of Porous Layers in Ordered Pillar Arrays for Liquid Chromatography," Lab Chip, Sep. 21, 2007, pp. 1705-1711.
Korean Office Action from Corresponding Korean Application No. 10-2019-7001997, dated Feb. 17, 2022.
Office Action from corresponding Japanese Application No. 2022-080775, dated Mar. 28, 2023.

PRODUCTION OF CHEMICAL REACTORS

FIELD OF THE INVENTION

The present invention generally relates to chemical reactors such as, for example chromatographic systems. More specifically, the present invention relates to chemical reaction production techniques as well as to the resulting chemical reactors, for example, chemical reactors with multiple parallel channels which optionally may also comprise microfabricated pillar structures.

BACKGROUND OF THE INVENTION

Systems that utilise liquid propagation have a large number of applications, including chemical component production, nanoparticle synthesis, separation and/or extraction of components, etc. A specific example of a separation technique for separating mixtures, for example, to be able to analyse them accurately, is chromatography. There is a variety of forms of chromatography such as gas chromatography, gel chromatography, thin-layer chromatography, adsorption chromatography, affinity chromatography, liquid chromatography, etc.

Liquid chromatography is typically used in pharmacy and chemistry, both for analytical and for production applications. In liquid chromatography, use is made of the difference in affinity of different substances with a mobile phase and a stationary phase. Because each substance has its own 'adhesive power' to the stationary phase, they are carried along faster or slower with the mobile phase, thus separating certain substances from others. It is basically applicable to any bond, it has the advantage that no evaporation of the material is necessary and that variations in temperature only have a negligible effect.

A typical example of liquid chromatography is based on chromatographic columns based on one or more channels filled with microfabricated columns. Since their introduction in liquid chromatography, chromatographic columns based on microfabricated columns have proven to be a worthy alternative for systems based on packed bed structures and monolithic systems. Because the microfabricated columns can be applied with a high degree of uniformity and perfectly arranged, the dispersion resulting from differences in flow paths or 'Eddy dispersion' can be almost completely avoided. This principle is more commonly applicable in chemical reactors based on liquid plug propagation.

Although the problem is known of edge effects caused by the difference in flow rate at the wall of a column and in the centre of the channel—assuming equally accurately produced pillar structures at the edge as in the centre—as described, for example, in international patent application WO2014/122592, it appears that not all deviations in efficiency of the columns with pillar structures can be explained by this.

It has been determined, for example, in structures with multiple parallel channels (typically chosen to generate a long column with high separation power but where the length of the substrate used is limited) that the separation efficiency in the outer channels is typically lower than the efficiency in channels more centrally located in the structure.

Consequently, there is a need for columns with improved efficiency or uniformity.

SUMMARY OF THE INVENTION

It is an object of embodiments according to the present invention to provide production methods as well as chemical reactors with one or more channels, the efficiency in all channels of the column being comparable. One specific example of such a chemical reactor is, for example, a chromatographic column with pillar structures for separating materials.

It was surprisingly found that in conventional production of columns with one or more channels, structures in channels located on an outer edge of the column structure are formed differently than pillar structures in channels surrounded by other channels.

It is an advantage of embodiments of the present invention that compensation is provided for the variation in production of structures in channels located on an outer edge of the column structure compared with structures in channels surrounded by other channels of the column structure.

It is an advantage of embodiments of the present invention that efficient systems for separating materials can be produced.

It is an advantage of embodiments of the present invention that systems can be produced with multiple parallel channels filled with pillar structures for separating materials, where channels to the outside of the structure may be similarly efficient at separating materials as channels which are surrounded on both sides by at least one other channel.

It is an advantage of embodiments according to the present invention that they allow systems with pillar structures to be produced in which the efficiency of different channels in a set of parallel channels is equivalent, without requiring limitations to the pillars used in the channels.

It is an advantage of at least some embodiments according to the present invention that the provided systems have a very good separation power in all channels.

The above object is accomplished by a device and a method according to embodiments of the present invention.

The present invention relates to a method of making a chemical reactor implemented on a substrate, the chemical reactor comprising one or more effective channels for transporting a liquid and/or gas during use of the chemical reactor, the channels optionally comprising structures or pillar structures. The chemical reactor comprises, among other things, an input connected to one or more effective channels to allow liquid/gas into the effective channels, and an output connected to one of the one or more effective channels to remove at least one component of the liquid/gas from the effective channels. The method comprises obtaining an initial design of the chemical reactor with the one or more effective channels, the input and the output, further introducing into the initial design at least a portion of a structured area positioned adjacent to an effective channel of the one or more effective channels located at the edge of the initial design, wherein the structured area is not fluidly connected to one of the effective channels, so as to obtain a further design, and the production of the chemical reactor according to the further design, the production comprising generating an electrical current density in the substrate and the structured area at least partially compensating for a non-uniformity in electrical current density during the production in effective channels positioned on the outside of the initial design. The non-uniformity can be an asymmetry.

It is an advantage of embodiments according to the present invention that by using structured areas, for example, dummy channels, the production of the effective channels can be done in a qualitatively better way. The effective channels positioned on the outside of the initial design thus deviate less, or not at all, from the effective channels positioned in the centre of the initial design. If the design includes only one effective channel, then the edges of the effective channel are made more accurate by using one or more dummy channels.

The structured area may be positioned at less than 150 μm from the effective channel, for example, at less than 100 μm.

The one or more effective channels may comprise a plurality of substantially parallel effective channels, the plurality of effective channels being fluidly interconnected in a meandering structure.

The structured area may comprise a dummy channel, the dummy channel being a channel that is not used for transport of liquid and/or gas during use of the reactor. A dummy channel typically has no connection to the effective channels and does not have to be provided with an input or an output.

The dummy channel may have a depth equal to the depth of the effective channels.

Alternatively, the dummy channel may have a depth smaller or greater than the depth of the effective channels.

The dummy channel may have the same design as the effective channel positioned on the other side of the effective channel next to which the dummy channel is implemented.

The dummy channel may comprise pillar structures. The dummy channel may also not comprise include pillar structures.

The dummy channel may have the same design as the effective channel positioned on the other side of the effective channel next to which the dummy channel is implemented.

Generating an electrical current density in the substrate is done to create or process the channels and the pillar structures, wherein the structured area is chosen such that the current density in the effective channels positioned on the outside of the initial design is identical to that in other effective channels, with a 10% error margin.

The production of the chemical reactor according to the further design may comprise the step of anodising a surface.

In some embodiments, the structured area is an area in which the free surface area is enlarged by applying a structure to this surface.

In another aspect, the present invention relates to a chemical reactor produced by a method as described above. The chemical reactor may be a chromatographic column.

The present invention further relates to a chemical reactor implemented on a substrate, the chemical reactor comprising one or more effective channels for transporting a liquid and/or gas during use of the chemical reactor, wherein the channels optionally comprise pillar structures, an input connected to one of the one or more effective channels to allow the liquid and/or gas into the effective channels, and an output connected to one of the one or more effective channels to remove at least one component of the liquid/gas from the effective channels.

The substrate further comprises a structured area positioned adjacent to an effective channel of the one or more effective channels located at the edge of the chemical reactor, the structured area not being fluidly connected to one of the effective channels.

The chemical reactor may be a chromatographic column.

The structured area may be located at less than 150 μm from the effective channel.

The one or more effective channels may comprise a plurality of substantially parallel effective channels, the plurality of effective channels being fluidly interconnected in a meandering structure.

The structured area may be or comprise a dummy channel. The structured area is typically a channel that is not used for transport of liquid and/or gas during use of the reactor.

A dummy channel typically has no connection to the effective channels and does not have to be provided with an input or an output.

The dummy channel may have a depth equal to the depth of the effective channels.

The dummy channel may have the same design as the effective channel positioned on the other side of the effective channel next to which the dummy channel is implemented.

The dummy channel may comprise pillar structures.

Alternatively, the dummy channel may not comprise pillar structures.

The dummy channel may have the same design as the effective channel positioned on the other side of the effective channel next to which the dummy channel is implemented.

In another aspect, the present invention also relates to a design for a chemical reactor as described above.

In another aspect, the present invention also relates to a design for a chemical reactor as described above. Features of the dependent claims may be combined with features of the independent claims and with features of other dependent claims as appropriate and not merely as explicitly set out in the claims.

Figure 1:
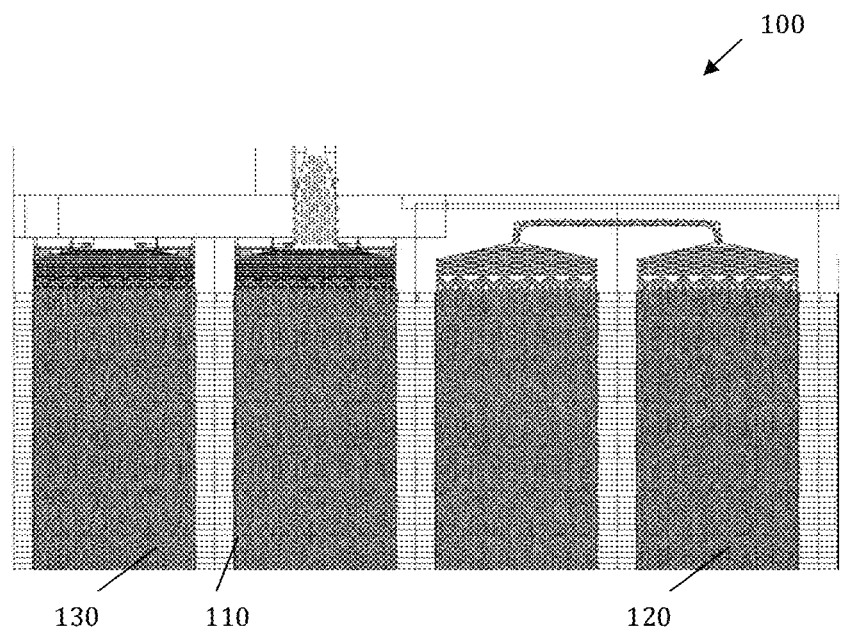
FIG. 1 illustrates a design of a chemical reactor according to an embodiment of the present invention, the chemical reactor being provided with a dummy channel.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention. Any reference signs in the claims shall not be construed as limiting the scope.

DETAILED DESCRIPTION OF ILLUSTRATIVE EMBODIMENTS

Although the present invention will be described with reference to particular embodiments and to certain drawings, the invention is not limited thereto but only by the claims.

It is to be noticed that de term 'having' and 'comprising', as used in the claims, should not be interpreted as being restricted to the means listed thereafter; it does not exclude other elements or steps. They are thus to be interpreted as specifying the presence of the stated features, integers, steps or components as referred to, but does not preclude the presence or addition of one or more other features, integers, steps or components, or groups thereof. Thus, the scope of the expression 'a device comprising means A and B' should not be limited to devices consisting only of components A and B. It means that with respect to the present invention, the only relevant components of the device are A and B.

Reference throughout this specification to 'one embodiment' or 'an embodiment' means that a particular feature, structure or characteristic described in connection with the embodiment is included in at least one embodiment of the present invention. Thus, instances of the phrases 'in one embodiment' or 'in an embodiment' in various places throughout this specification may, but do not necessarily, all refer to the same embodiment. Furthermore, the particular features, structures or characteristics may be combined in any suitable manner, as would be apparent to one of ordinary skill in the art from this disclosure, in one or more embodiments.

Similarly, it should be appreciated that in the description of illustrative embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In a first aspect, the present invention relates to a method for producing a chemical reactor. Such a chemical reactor may be, but is not limited to, a chromatographic column. Other examples of chemical reactors that may benefit from the present inventions are, for example, purification filters or trapping columns, reactors with catalysts (micro or otherwise), multi-phase reactors, fuel cells, electrochemical reactors, capillary electrochromatography reactors, etc. Chemical reactors which benefit from the present invention are those in which, during their production, a treatment step is performed while live/under an electrical field, such as, for example, an anodising step. Furthermore, reactors where a uniform electrical field is preferably present during use, and thus not only during production, can benefit from this. Furthermore, an advantage is also obtained in chemical reactors in which uniformity of supply and removal of heat plays a role. The structured area can also provide a benefit. In some embodiments, the present invention relates to a chromatographic column. The use of a structured area next to the effective channels can be extremely advantageous, for example, during the production of such columns. It is known to make pillar structures porous, which are provided in columns to, for example, improve chromatography. This dramatically improves the amount of free surface area, while maintaining the ordered structure of the system. However, any treatment process in which a voltage is applied or that occurs under an electric field can benefit from the present invention. As mentioned above, a thermal resistance of the channels may also be an advantage, individually or in combination with the current density during production (or even during operation). Optimisation can be implemented to achieve one or more of these features. In some embodiments, an optimisation can also be carried out, where not one optimal characteristic is obtained, but where two or more optimal characteristics (e.g., uniform current density during production and uniform thermal resistance) are jointly improved.

According to embodiments of the present invention, the chemical reactor comprises one or more effective channels. Such channels are often microfluidic channels. In some embodiments, the channels may comprise pillar structures. The chemical reactor further comprises an input connected to one of the one or more effective channels to allow fluid/gas into the effective channels. The chemical reactor further comprises an output connected to one of the one or more effective channels to remove at least one component of the liquid/gas from the effective channels.

According to embodiments of the present invention, the method comprises obtaining an initial design of the chemical reactor with the one or more effective channels, the input and the output. The method further comprises—this step can take place simultaneously with the previous step—introducing into the initial design at least a portion of a structured area positioned adjacent to an effective channel of the one or more effective channels located at the edge of the initial design. The structured area is not fluidly connected with one of the effective channels. In this way, a further design is obtained. The structured area can be adapted to ensure that, during production, the current density in the nearby effective channel is as uniform as possible. The structured area may—alternatively or additionally—be adapted to ensure that the heat supply/heat removal is optimised during production or during use. Thus, an improved or optimised exothermic and endothermic reactor can be obtained. In some embodiments, both features are improved at the same time. This can result in a reactor in which both features have been improved, but neither of the features has achieved the absolute optimum.

The method further comprises the production of the chemical reactor according to the further design. There are many ways known to make a pillar-based chromatographic column. By way of illustration, an example for producing a chemical reactor will be given.

An illustrative process for making a chemical reactor is shown in De Malsche et al. Lab on a Chip 7 (2007) 1705-1711. In this example, a process is disclosed for producing a chromatographic column with pillar structures. The illustrative process is based on chip manufacturing, although embodiments are not limited to this. In a first step of the example, 300 nm LPCVD SiN is deposited on a silicon wafer. In a subsequent step, the pillars are defined by means of lithography, which are further made in the SiN by means of RIE etching. In a subsequent step, the resist is removed and delivery channels are defined through this further step. In the subsequent step, these channels are RIE etched in SiN and then 50 μm Bosch etched. The resist is then removed and both the delivery channels and the pillars are then etched over 10 μm in the silicon. A 750-nm layer of aluminium is then deposited on the back of the wafer and the wafer is placed in a holder to anodise the top side of the wafer. After the anodisation, the aluminium layer is etched away and the feed-through holes to the channels are formed through the rear side, the front side being covered, for example, with a foil, to avoid contamination. The product is finally cleaned with nitric acid, cleaned in deionised water, and anodically bonded to a glass substrate.

The technique described above is just one example of a production method for the chemical reactor. Embodiments according to the present invention are not limited thereto. The methods according to embodiments of the present invention are characterised in that a particular design is used, wherein structures are provided outside the product that will be actively used, to achieve a more homogeneous treatment of the parts of the product in a live treatment step.

In a second aspect, the present invention relates to a chemical reactor. This can be produced according to a method as described above, although embodiments of the present invention are not limited thereto. The present invention relates to a chemical reactor implemented on a substrate, the chemical reactor comprising one or more effective channels, the channels optionally comprising pillar structures, an input connected to one of the one or more effective channels to allow the liquid/gas into the effective channels, and an output connected to one of the one or more effective channels to remove at least one component of the liquid/gas from the effective channels. The substrate further comprises a structured area positioned adjacent to an effective channel of the one or more effective channels located at the edge of the chemical reactor, the structured area not being fluidly connected to one of the effective channels. In some embodiments, the structured area is a dummy channel, sufficiently closely positioned to an effective channel positioned at the edge of the structure, to achieve similar power distributions during production. The distance can, for example, be smaller than 150 μm up to the effective channel, for example, smaller than 100 μm up to the effective channel. Alternatively, the structured area can be a surface on which structures are provided which result in a greater free surface area than the systems known in the art. The dummy channel can have a depth equal to the depth of the effective channels or a depth smaller than the depth of the effective channels.

The materials the reactor is made of can correspond to materials such as known in the prior art. Typically, materials are used that can be anodised.

The features of the channels, and any pillars, may correspond to those known in the prior art. The channels may, for example, have a width between 50 μm and 250 mm, for example, between 50 μm and 100 mm, for example, between 50 μm and 100 mm, for example, between 50 μm and 20 mm. The channels can have a depth between 2 μm and 1 mm, for example, between 2 μm and the typical wafer thickness of a silicon wafer. The pillars may have a typical size between 100 nm and 3 mm, for example, between 100 nm and 100 μm.

Figure 2:
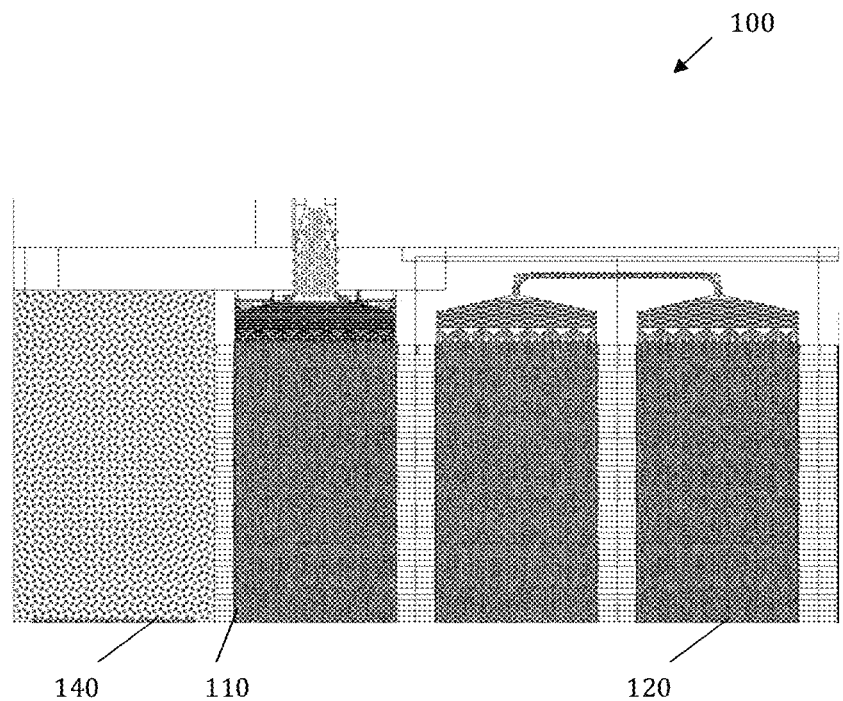
FIG. 2 illustrates a design of a chemical reactor according to an embodiment of the present invention, the chemical reactor being provided with a structured surface.

FIG. 1 shows a first example of a design for a chemical reactor 100, wherein a plurality of parallel effective channels 110 are provided which comprise column structures 120. In the present design, a dummy channel 130 is also provided. FIG. 2 shows a second example of a design for a chemical reactor 100, wherein, instead of a dummy channel 130, a structured surface 140 is provided. Such a structured surface 140 consists of the standard surface typically present, but comprising structural elements. The structural elements can be protrusions or pits. The structural elements may have a typical size between 100 nm and 100 μm.

The invention claimed is:

1. A method for producing a chemical reactor implemented on a substrate, the chemical reactor comprising
one or more effective channels for transporting a liquid and/or gas during use of the chemical reactor, the effective channels optionally comprising pillar structures,
an input connected to one of the one or more effective channels to allow liquid/gas into the effective channels, and
an output connected to one of the one or more effective channels to remove at least one component of the liquid and/or gas from the effective channels,
the method comprising:
obtaining an initial design of the chemical reactor with the one or more effective channels, the input and the output;
further introducing into the initial design at least a portion of a structured area positioned adjacent to an effective channel of the one or more effective channels located at an edge of the initial design, the structured area not being fluidly connected to one of the effective channels, to obtain a further design;
the production of the chemical reactor according to the further design, the production comprising the generation of an electrical current density in the substrate, and wherein the structured area at least partially compensates during production for a non-uniformity in the electrical current density in effective channels positioned on the outside of the initial design,
wherein the structured area comprises a dummy channel, the dummy channel being a channel that is not used for transporting liquid and/or gas during use of the chemical reactor.

2. The method according to claim 1, the structured area being positioned at less than 150 μm from the effective channel.

3. The method according to claim 1, the one or more effective channels comprising a plurality of substantially parallel effective channels, the plurality of effective channels being fluidly interconnected in a meandering structure.

4. The method according to claim 1, the dummy channel having a depth equal to the depth of the effective channels or the dummy channel having a depth smaller or greater than the depth of the effective channels.

5. The method according to claim 1, the dummy channel having the same design as the effective channel positioned on the other side of the effective channel next to which the dummy channel is implemented.

6. The method according to claim 1, the dummy channel comprising pillar structures.

7. The method according to claim 6, the dummy channel having the same design as the effective channel positioned on the other side of the effective channel next to which the dummy channel is implemented.

8. The method according to claim 1, in which the generation of the electrical current density in the substrate is done to form or process the channels and the pillar structures, the structured area being so selected that the electrical current density in the effective channels positioned on the outside of the initial design are symmetrical, with an error margin of 10%.

9. The method according to claim 1, the production of the chemical reactor according to the further design comprising an anodising step.

10. The method according to claim 1, the structured area being an area in which structural elements are arranged to increase an effective surface.

11. The method according to claim 1, wherein the production of the chemical reactor comprises one or more chip manufacturing steps.

12. The method according to claim 1, wherein,
the one or more effective channels comprises a plurality of substantially parallel effective channels, the plurality of parallel effective channels being fluidly interconnected in a meandering structure, and
the structured area comprises one or more dummy channels, the one or more dummy channels having the same design as the parallel effective channels, wherein the dummy channel is not used for transporting liquid and/or gas during use of the reactor.

13. The method according to claim 9, wherein the anodising step provides porous pillar structures.

* * * * *